(12) United States Patent
Terada et al.

(10) Patent No.: US 9,843,178 B2
(45) Date of Patent: Dec. 12, 2017

(54) CURVATURE RESTRAINING MEMBER AND POWER FEEDING DEVICE

(71) Applicant: Yazaki Corporation, Tokyo (JP)

(72) Inventors: Tomoyasu Terada, Makinohara (JP);
Tsukasa Sekino, Makinohara (JP);
Hiroshi Yamashita, Makinohara (JP);
Tatsuya Otsuka, Makinohara (JP)

(73) Assignee: Yazaki Corporation, Tokyo (JP)

( * ) Notice: Subject to any disclaimer, the term of this patent is extended or adjusted under 35 U.S.C. 154(b) by 89 days.

(21) Appl. No.: 15/002,665

(22) Filed: Jan. 21, 2016

(65) Prior Publication Data

US 2016/0218496 A1    Jul. 28, 2016

(30) Foreign Application Priority Data

Jan. 23, 2015    (JP) ................................. 2015-011267

(51) Int. Cl.
*H02G 3/04* (2006.01)
*B60R 16/027* (2006.01)

(52) U.S. Cl.
CPC ......... *H02G 3/0462* (2013.01); *B60R 16/027* (2013.01)

(58) Field of Classification Search
None
See application file for complete search history.

(56) References Cited

U.S. PATENT DOCUMENTS

| | | | | |
|---|---|---|---|---|
| 4,470,622 A | * | 9/1984 | Pate | ...................... F16L 3/1236 |
| | | | | 285/419 |
| 7,284,785 B2 | * | 10/2007 | Gotou | .................. H02G 3/0475 |
| | | | | 174/72 A |
| 8,070,212 B2 | * | 12/2011 | Shima | ................. B60R 16/0207 |
| | | | | 296/146.9 |
| 9,637,070 B2 | * | 5/2017 | Ogawa | ................... H02G 11/00 |

(Continued)

FOREIGN PATENT DOCUMENTS

| | | |
|---|---|---|
| JP | 2006-327328 A | 12/2006 |
| JP | 2009-273312 A | 11/2009 |

(Continued)

OTHER PUBLICATIONS

Office Action drafted Dec. 20, 2016, issued for the Japanese patent application No. 2015-011267 and English translation thereof.

(Continued)

*Primary Examiner* — Chau N Nguyen
*Assistant Examiner* — Muhammed Azam
(74) *Attorney, Agent, or Firm* — Locke Lord LLP (57) ABSTRACT

A curvature-restraining member and a power feeding device include a wire harness having an electric wire and a corrugated tube (flexible tube). The curvature-restraining member restrains the wire harness from curving in a predetermined curving direction D3 with a radius of curvature smaller than a reference radius. The curvature restraining member includes a body portion placed near at least one of ends of the corrugated tube and extending in a length direction of the electric wire, and a curved portion extending from one end (Continued)

of the corrugated tube opposite from the former end, and curving in the curving direction D3 with a radius of curvature not less than the reference radius with such a length that it falls within the straightly extending corrugated tube.

9 Claims, 7 Drawing Sheets

(56) References Cited

U.S. PATENT DOCUMENTS

| | | | | |
|---|---|---|---|---|
| 9,653,906 B2* | 5/2017 | Sakanobe | | H02H 3/08 |
| 9,701,262 B2* | 7/2017 | Sekino | | H02G 11/006 |
| 2002/0005014 A1* | 1/2002 | Doshita | | B60R 16/027 |
| | | | | 49/360 |
| 2004/0003543 A1* | 1/2004 | Kobayashi | | B60R 16/0215 |
| | | | | 49/360 |
| 2004/0250525 A1* | 12/2004 | Kobayashi | | B60R 16/0215 |
| | | | | 59/78.1 |
| 2005/0062310 A1* | 3/2005 | Kida | | B60R 16/0215 |
| | | | | 296/56 |
| 2005/0092511 A1* | 5/2005 | Sekino | | B60R 16/0215 |
| | | | | 174/72 A |
| 2008/0142260 A1* | 6/2008 | Yamaguchi | | B60N 2/0224 |
| | | | | 174/72 A |
| 2009/0223132 A1* | 9/2009 | Aoki | | H02G 11/00 |
| | | | | 49/360 |
| 2010/0243317 A1* | 9/2010 | Katou | | B60R 16/027 |
| | | | | 174/72 A |
| 2010/0243318 A1* | 9/2010 | Katou | | B60R 16/027 |
| | | | | 174/72 A |
| 2010/0263926 A1* | 10/2010 | Murayama | | B60R 16/0207 |
| | | | | 174/71 R |
| 2010/0270075 A1* | 10/2010 | Murayama | | B60R 16/0207 |
| | | | | 174/72 A |
| 2011/0147078 A1* | 6/2011 | Satou | | B60R 16/0215 |
| | | | | 174/72 A |
| 2012/0024564 A1* | 2/2012 | Sekino | | B60N 2/0705 |
| | | | | 174/68.3 |
| 2013/0000941 A1* | 1/2013 | Taniguchi | | B60R 16/0215 |
| | | | | 174/68.3 |
| 2013/0001374 A1* | 1/2013 | Kida | | B60R 16/0215 |
| | | | | 248/70 |
| 2013/0126233 A1* | 5/2013 | Nagayasu | | B60R 16/0215 |
| | | | | 174/72 A |
| 2013/0181512 A1* | 7/2013 | Terada | | B60R 16/0215 |
| | | | | 307/10.1 |
| 2013/0214099 A1* | 8/2013 | Okumura | | B60R 16/027 |
| | | | | 248/74.3 |
| 2014/0238740 A1* | 8/2014 | Inoue | | H02G 11/006 |
| | | | | 174/72 A |
| 2014/0299370 A1* | 10/2014 | Ikeda | | B60R 16/027 |
| | | | | 174/72 A |
| 2014/0339376 A1* | 11/2014 | Katou | | B60R 16/027 |
| | | | | 248/49 |
| 2015/0102182 A1* | 4/2015 | Sekino | | B60R 16/0215 |
| | | | | 248/70 |
| 2015/0203057 A1* | 7/2015 | Terada | | H02G 11/00 |
| | | | | 248/70 |
| 2015/0321626 A1* | 11/2015 | Sekino | | B60R 16/0215 |
| | | | | 174/72 A |
| 2015/0325989 A1* | 11/2015 | Sekino | | H02G 3/0468 |
| | | | | 174/68.3 |
| 2016/0185308 A1* | 6/2016 | Sekino | | H01B 7/1845 |
| | | | | 174/68.3 |
| 2016/0207480 A1* | 7/2016 | Sekino | | B60R 16/03 |
| 2016/0218496 A1* | 7/2016 | Terada | | B60R 16/027 |
| 2016/0229360 A1* | 8/2016 | Iimuro | | H02G 11/00 |
| 2016/0244004 A1* | 8/2016 | Sekino | | B60R 16/027 |
| 2016/0264075 A1* | 9/2016 | Kogure | | H02G 11/00 |
| 2016/0264076 A1* | 9/2016 | Kogure | | B60R 16/027 |

FOREIGN PATENT DOCUMENTS

| | | |
|---|---|---|
| JP | 2013-150540 A | 8/2013 |
| JP | 2014-143779 A | 8/2014 |
| WO | WO-2014/115674 A1 | 7/2014 |

OTHER PUBLICATIONS

Office Action dated Aug. 11, 2017 issued for corresponding Chinese Patent Application No. 201610048766.6.

* cited by examiner

CURVATURE RESTRAINING MEMBER AND POWER FEEDING DEVICE

BACKGROUND

Technical Field

The present invention relates to a curvature-restraining member for restraining an excessive curvature of a wire harness having electric wires and a flexible tube through which the electric wire is inserted, and to a power-feeding device to which the curvature-restraining member is applied.

Related Art

In a vehicle having a sliding door, there is a conventionally known power-feeding device which electrically connects a vehicle body and the sliding door to each other through a wire harness (see JP 2009-273312 A for example). According to this power-feeding device, the wire harness is held so that when the sliding door opens or closes, the wire harness can follow the sliding door and move in spontaneity.

Here, as a configuration to hold the wire harness as described above in the power feeding device, there is proposed a configuration that the wire harness is held by a swinging member capable of swinging around a swinging shaft which is parallel to the sliding door and which intersects with an opening/closing direction of the sliding door at right angles (see JP 2014-143779 A for example). According to this configuration, the swinging member swings when the sliding door opens or closes, and the wire harness can move in spontaneity.

SUMMARY

In such a power-feeding device having the swinging member, when the sliding door opens, an end of the wire harness on the side of the sliding door follows the sliding door and moves and according to this, the wire harness is bent outward of the vehicle and curved. As such a wire harness, one having electric wires and a flexible tube through which the electric wire is inserted is used in some cases. Here, if the wire harness is excessively curved with a too small radius of curvature, there is fear that the wire harness is prone to be damaged.

If the wire harness is curved, the electric wire therein makes a habit of bending in some cases. In the above-described power feeding device, when the sliding door closes, the end of the wire harness on the side of the sliding door is moved in a direction opposite from that when the sliding door opens, and the wire harness is bent back inward of the vehicle and is extended. At this time, if the electric wire has a habit of bending, the end of the wire harness on the side of the sliding door moves to a closed position in some cases while leaving the bent shape corresponding to the bending habit in the middle of the wire harness. In such a case, when the sliding door fully closes, the wire harness has a convex curved shape inward of the vehicle. Such a convex-curved wire harness inward of the vehicle is prone to attract passenger's attention, and there is fear that outward appearance in the vehicle is deteriorated.

Therefore, the above-described problem is focused, and the object of the present invention is to provide a curvature restraining member capable of suppressing an excessive curvature of the wire harness, and capable of suppressing a bending habit of electric wires when the wire harness is extended after it is curved, and to provide a power feeding device to which the curvature restraining member is applied.

To achieve the above described object, a first aspect of the invention provides a curvature restraining member in which a wire harness includes an electric wire and a flexible tube through which the electric wire is inserted, the curvature restraining member being placed between an inner surface of the flexible tube and the electric wire in the wire harness, and the curvature restraining member restraining the wire harness from curving with a radius of curvature smaller than a reference radius in a predetermined curving direction, the curvature restraining member including: a body portion placed near at least one of ends of the flexible tube and which extends in a length direction of the electric wire; and a curved portion which extends from one end of the flexible tube in the body portion opposite from the former end, and which curves in the curving direction with a radius of curvature not less than the reference radius with such a length that it falls within the straightly extending flexible tube.

A second aspect of the invention provides the curvature restraining member according to the first aspect, wherein the body portion is formed into a shape forming a portion of a cylinder through which the electric wire passes, and the curvature restraining member includes a lid, the lid being connected, through a hinge, to one of a pair of side edges extending in the length direction of the electric wire in the body portion such that the lid can open and close, and having a shape forming the other portion of the cylinder.

A third aspect of the invention provides the curvature restraining member according to the second aspect, wherein a plurality of first ribs projecting in a direction intersecting with a peripheral wall of the cylinder are arranged along the other side edges of the pair of side edges of the body portion at a distance from each other, and a plurality of second ribs projecting in the direction intersecting with the peripheral wall are placed between the first ribs when the lid is closed, the second ribs being arranged on one of the pair of side edges projecting in the length direction of the electric wire in the lid which is opposite from the hinge, and the first ribs and the second ribs being arranged in a line.

A fourth aspect of the invention provides the curvature restraining member according to the third aspect, wherein a groove extending in a length direction of the flexible tube is formed in an inner surface of the flexible tube, and the first ribs and the second ribs which are arranged in the line when the lid is closed are fitted into the groove.

A fifth aspect of the invention provides the curvature restraining member according to any one of the first to fourth aspects, further including a flexible portion, wherein the flexible portion is connected to one end of the curved portion opposite from the body portion through a hinge such that the flexible portion is capable of being curved until a curved shape which is continuous with the curved portion is formed, and incapable of being curved with a radius of curvature smaller than the curved shape, and the flexible portion has such a flexible property that the flexible portion itself is also capable of being curved until the curved shape is formed, and incapable of being curved with a small radius of curvature.

Further, to achieve the above described object, a sixth aspect of the invention provides a power feeding device which electrically connects a vehicle body and a sliding door through a wire harness in a vehicle having the sliding door, wherein the wire harness includes an electric wire and a flexible tube through which the electric wire is inserted, the power feeding device includes a supporting member fixed to the vehicle body or the sliding door, a swinging member holding one end of the flexible tube and pivotally supported by the supporting member such that the swinging member can swing around a swinging axis which is parallel to the sliding door and which intersects with an opening/closing direction of the sliding door at right angles, and a curvature restraining member placed between an inner surface of the flexible tube and the electric wire for restraining the wire harness from curving in a predetermined curving direction with a radius of curvature smaller than a reference radius, and the curvature restraining member includes a body portion placed near at least one of ends of the flexible tube and extending in a length direction of the electric wire, and a curved portion extending from one end of the flexible tube opposite from the former end, and curving in the curving direction with a radius of curvature not less than the reference radius and having such a length that it falls within the straightly extending flexible tube.

According to the inventions described in the first to sixth aspects, by the curved portion extending from one end of the body portion, the wire harness is restrained from curving in the curving direction with the radius of curvature smaller than that of the curved portion. When the wire harness is bent back in the direction opposite from the curving direction and is extended, the electric wire in the wire harness is guided in the curving direction by the curved portion and is bent back. Even if the electric wire has the bending habit when the wire harness is curved, the curved shape in the bending habit of the electric wire is reformed by bending back in the direction opposite from the guiding direction to the curving direction by the curved portion. That is, when the wire harness is extended, the bending habit of the electric wire is corrected. According to the invention described in the first aspect, excessive curvature of the wire harness is suppressed, and it is possible to suppress the bending habit of the electric wire when the wire harness is extended after it is curved.

According to the invention described in the second aspect, since the cylinder is formed of the body portion and the lid, it is possible to enhance the strength against an external force applied to the body portion when the wire harness is bent.

According to the invention described in the third aspect, it is possible to further enhance the strength against an external force applied to the body portion by the first ribs and the second ribs which are arranged in the line.

According to the invention described in the fourth aspect, by fitting the first ribs and the second ribs into the groove formed in the inner surface of the flexible tube, it is possible to prevent the curvature-restraining member from rotating in an inner peripheral direction of the flexible tube.

According to the invention described in the fifth aspect, the flexible portion connected to one end of the curved portion which is opposite from the body portion is connected to the curved portion through the hinge such that the flexible portion can curve up to a curved shape which is continuous with the curved portion, but cannot curve when it has a curved shape which is smaller than the former curved shape, and the flexible portion has such flexible property that the flexible portion can curve. According to this, an outlying portion from the curved portion can curve, but the wire harness is restrained from curving with a radius of curvature smaller than the reference radius of the wire harness. Therefore, according to the invention described in the fifth aspect, it is possible to further suppress the excessive curve of the wire harness.

DETAILED DESCRIPTION

A curvature-restraining member and a power-feeding device according to an embodiment of the present invention will be described with reference to FIGS. 1 to 7A and 7B.

Figure 1:
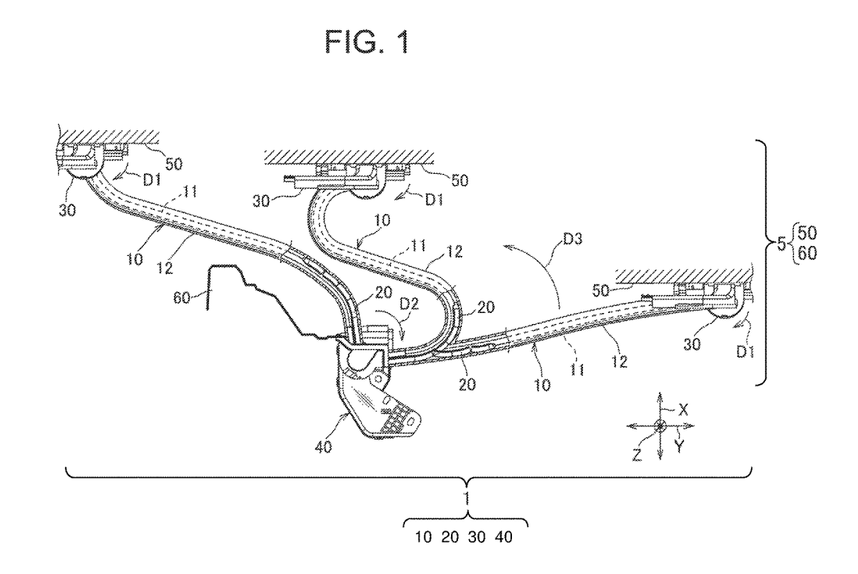
FIG. 1 is a diagram showing a power-feeding device to which a curvature-restraining member of one embodiment of the present invention is applied.

FIG. 1 is a diagram showing the power-feeding device to which the curvature-restraining member of one embodiment of the present invention is applied. The power-feeding device 1 of the embodiment electrically connects a vehicle body 60 and a sliding door 50 to each other through a wire harness 10 in a vehicle 5 having the sliding door 50. In FIG. 1, a right side therein corresponds to a front side of the vehicle 5, a left side corresponds to a rear side of the vehicle 5, an upper side corresponds to an outer side of the vehicle, and a lower side corresponds to an inner side of the vehicle. A vertical direction in the drawing is an X direction in the embodiment, a lateral direction in the drawing is a Y direction in the embodiment, and a direction perpendicular to a sheet surface is a Z direction.

In the power-feeding device 1, electricity is supplied from a power supply (not shown) provided in the vehicle body 60 to electric equipment (not shown) provided in the sliding door 50 through the wire harness 10. In this power feeding device 1, electric signals are sent and received between control means (not shown) provided in the vehicle body 60 and the electric equipment (not shown) provided in the sliding door 50 through the wire harness 10. The power-feeding device 1 includes the wire harness 10, the curvature-restraining member 20, a door-side unit 30 and a vehicle body-side unit 40.

The wire harness 10 includes a plurality of electric wires 11 and a corrugated tube 12 which is a synthetic resin flexible tube through which the electric wires 11 are inserted. The corrugated tube 12 is coated between the vehicle body 60 in the electric wires 11 and the sliding door 50. One end of the corrugated tube 12 is held by the door-side unit 30 such that the corrugated tube 12 can swing in a Z direction which is the vertical direction of the vehicle as a swinging axial direction, and the other end of the corrugated tube 12 is held by the vehicle body-side unit 40 such that the corrugated tube 12 can swing in the Z direction as a swinging axial direction. The door-side unit 30 is fixed to the sliding door 50. In the door-side unit 30, the one end of the corrugated tube 12 is biased in a direction of an arrow D1 such that the one end moves toward the sliding door 50 when the sliding door 50 fully closes. The vehicle body-side unit 40 is fixed to the vehicle body 60. In the vehicle body-side unit 40, the other end of the corrugated tube 12 is biased in a direction of an arrow D2 such that the other end moves inward of the vehicle when the sliding door 50 fully closes.

The sliding door 50 is opened and closed in the Y direction which is the longitudinal direction of the vehicle. When the sliding door 50 is opened to the fully opened state from the fully closed state, in the door-side unit 30, the one end of the corrugated tube 12 swings in a direction separating away from the sliding door 50 against the above-described biasing force. At this time, in the vehicle body-side unit 40, the other end of the corrugated tube 12 swings outward of the vehicle against the biasing force. When the sliding door 50 is closed from the fully opened state toward the fully closed state, in the door-side unit 30, the one end of the corrugated tube 12 swings toward the sliding door 50 in accordance with the biasing force. At this time, in the vehicle body-side unit 40, the other end of the corrugated tube 12 swings inward of the vehicle in accordance with the biasing force.

Here, in this power-feeding device 1 when the sliding door 50 halfway opens which is a state between the fully closed state and the fully opened state, the wire harness 10 is bent outward of the vehicle and curved as shown in FIG. 1 especially in the vicinity of the vehicle body-side unit 40. At this time, to restrain excessive curvature of the wire harness 10, the curvature-restraining member 20 is provided. The curvature-restraining member 20 is placed between an inner surface of the flexible tube 12 and the electric wires 11, and the curvature-restraining member 20 restrains the wire harness 10 from curving in a curving direction D3 with an excessively small radius of curvature. In this embodiment, the curvature-restraining member 20 is held by the vehicle body-side unit 40 together with a vehicle body-side end of the corrugated tube 12.

Figure 2:
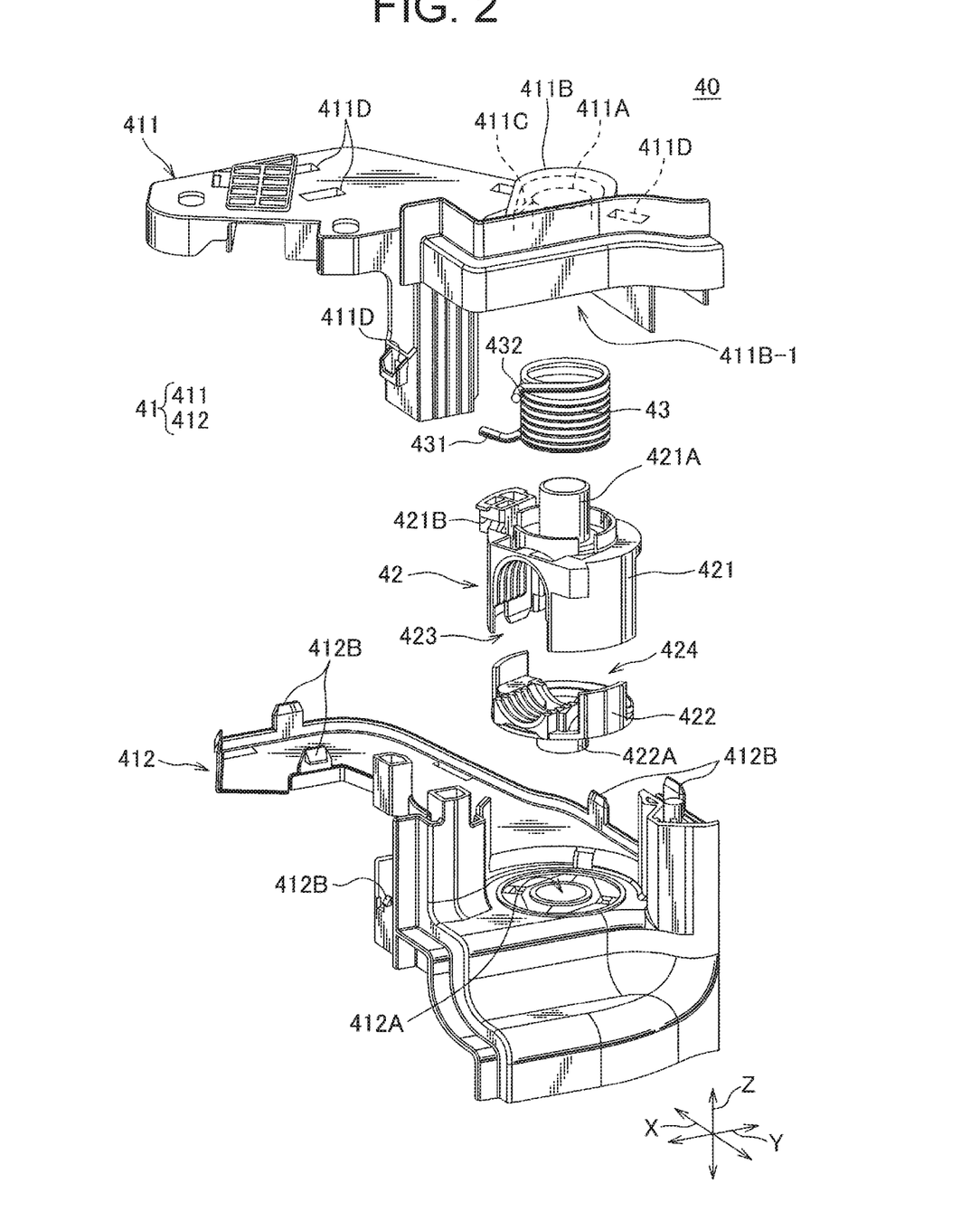
FIG. 2 is an exploded perspective view showing a vehicle body-side unit shown in FIG. 1.

FIG. 2 is an exploded perspective view showing the vehicle body-side unit shown in FIG. 1. In FIG. 2 also, the X direction, the Y direction and the Z direction in FIG. 1 are shown. In FIG. 2, unlike FIG. 1, a right side corresponds to the rear side of the vehicle 5, and a left side corresponds to the front side of the vehicle 5. The upper side in FIG. 2 corresponds to the upper side of the vehicle 5, and the lower side in FIG. 2 corresponds to the lower side of the vehicle 5.

The vehicle body-side unit 40 includes a vehicle body-side supporting member 41, a vehicle body-side swinging member 42 and a vehicle body-side coil spring 43. The vehicle body-side supporting member 41 is fixed to a frame (not shown) of the vehicle body 60. The vehicle body-side swinging member 42 holds the vehicle body-side one end in the corrugated tube 12, thereby holding the wire harness 10. The vehicle body-side swinging member 42 is pivotally supported by the vehicle body-side supporting member 41 such that the vehicle body-side swinging member 42 can swing in an opening/closing direction (Y direction) of the sliding door 50 around a swinging axis of which axial direction is the Z direction which is parallel to the sliding door 50 and intersects with the opening/closing direction (Y direction) of the sliding door 50 at right angles. The vehicle body-side coil spring 43 is wound around this swinging axis, and biases the vehicle body-side swinging member 42 in the swinging direction shown by the arrow D2 in FIG. 1 around the swinging axis of the vehicle body-side swinging member 42. The vehicle body-side supporting member 41 corresponds to one example of the supporting member of the present invention, and the vehicle body-side swinging member 42 corresponds to one example of the swinging member of the present invention.

The vehicle body-side swinging member 42 includes a first swinging member 421 and a second swinging member 422. The first swinging member 421 includes a first shaft portion 421A projecting upward in the Z direction, and a first locking portion 421B engaged with one end 431 of the vehicle body-side coil spring 43. The second swinging member 422 includes a second shaft portion 422A projecting to a lower side in the Z direction. If the first swinging member 421 and the second swinging member 422 are assembled together, they open in a direction intersecting with the Z direction at right angles, and a vehicle body-side tube fixing opening 423 is formed. The one end of the corrugated tube 12 is fixed to the vehicle body-side tube fixing opening 423. In the vehicle body-side swinging member 42, an insertion passage 424 of the electric wires 11 which penetrate the vehicle body-side swinging member 42 is formed, from the vehicle body-side tube fixing opening 423, such that the insertion passage 424 intersects with the swinging axis at right angles. The electric wires 11 which come out from the one end of the corrugated tube 12 pass through the insertion passage 424 and extends inward of the vehicle through the insertion passage 424.

The vehicle body-side supporting member 41 includes a first supporting member 411 and a second supporting member 412. The first shaft portion 421A is inserted into the first supporting member 411, and is provided with a first bearing 411A which pivotally supports the first shaft portion 421A. A spring accommodating portion 411B for accommodating the vehicle body-side coil spring 43 is formed such that the spring accommodating portion 411B surrounds the first bearing 411A. The spring accommodating portion 411B includes an opening 411B-1 which opens downward in the vehicle. This opening 411B-1 is closed with an upper surface of the first swinging member 421. A second locking portion 411C engaged with the other end 432 of the vehicle body-side coil spring 43 is provided in the spring accommodating portion 411B. The first supporting member 411 is provided with a plurality of engaging holes 411D for assembling the second supporting member 412.

A second shaft portion 422A is inserted into the second supporting member 412 in the vehicle body-side supporting member 41, and the second supporting member 412 is provided with a second bearing 412A which pivotally supports the second shaft portion 422A. The second supporting member 412 is provided with a plurality of engaging projections 412B which enters the plurality of engaging holes 411D in the first supporting member 411 and engage the engaging holes 411D.

The first shaft portion 421A is pivotally supported by the first bearing 411A, and the first supporting member 411 and the second supporting member 412 are assembled together in a state where the second shaft portion 422A is pivotally supported by the second bearing 412A. The second supporting member 412 is fixed to the body 60 through a fixing structure (not shown).

In this embodiment, the curvature-restraining member 20 shown in FIG. 1 is inserted into the corrugated tube 12 from the vehicle body-side end of the corrugated tube 12. The curvature-restraining member 20 is held by the vehicle body-side tube fixing opening 423 in the vehicle body-side swinging member 42 together with the vehicle body-side end of the corrugated tube 12.

Figure 3:
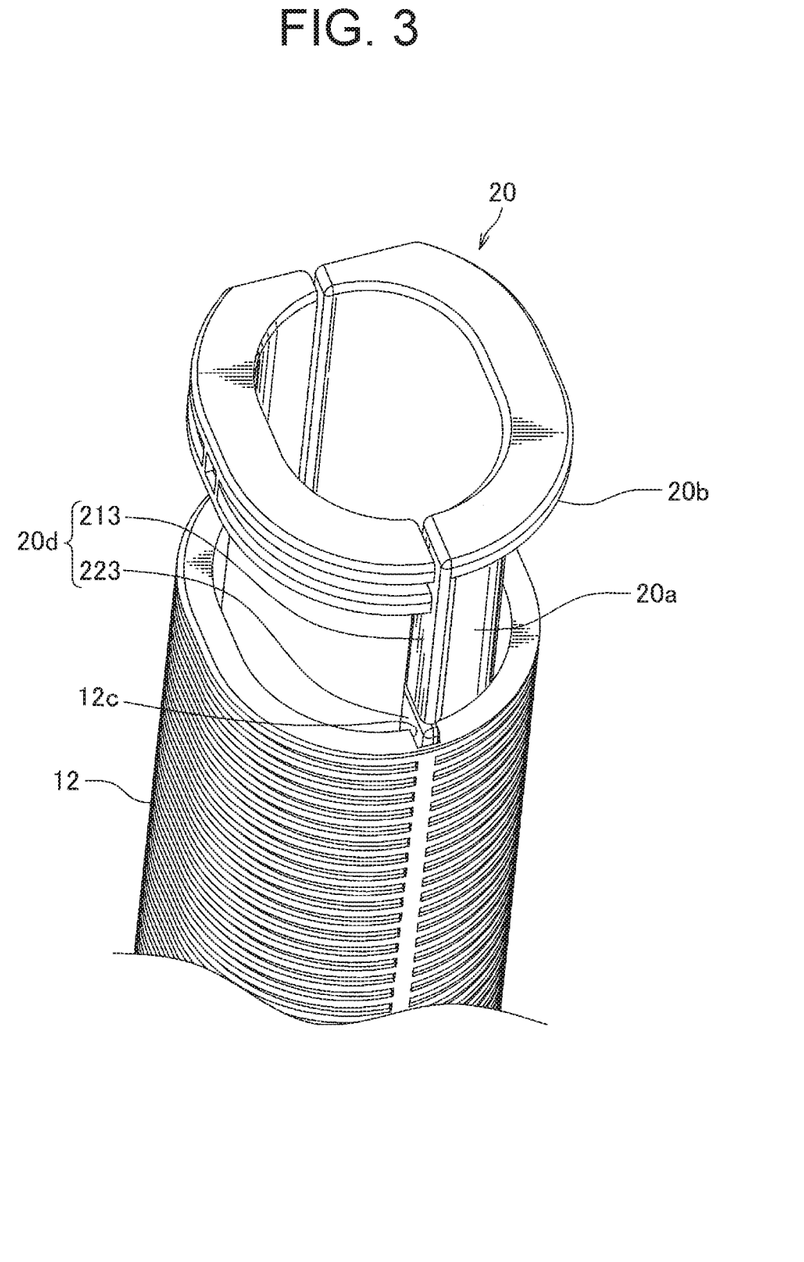
FIG. 3 is a diagram showing a state where the curvature restraining member shown in FIG. 1 is inserted into a corrugated tube from a vehicle body-side end of the corrugated tube.
Figure 4:
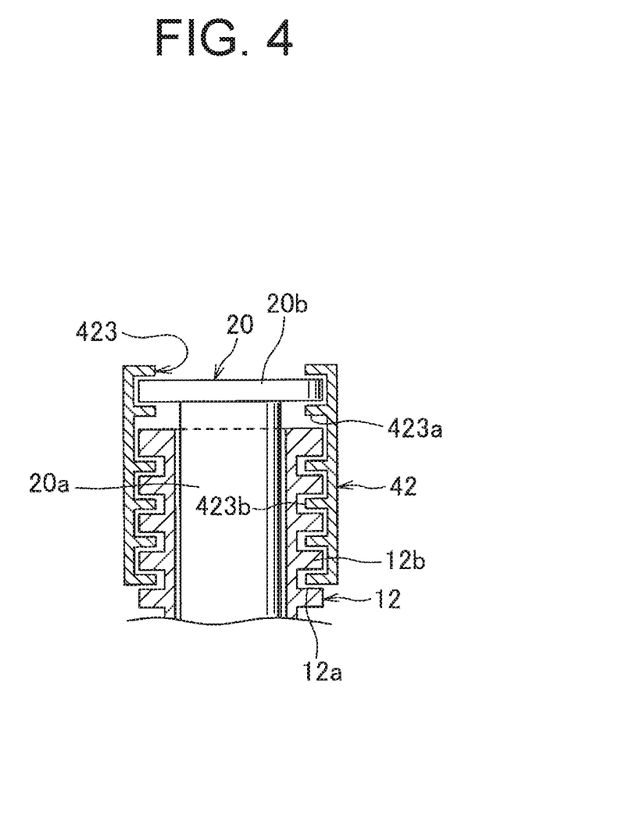
FIG. 4 is a schematic sectional view showing a state where the curvature restraining member is held by a vehicle body-side tube fixing opening in a vehicle body-side swinging member together with the vehicle body-side end of the corrugated tube.

FIG. 3 is a diagram showing a state where the curvature-restraining member shown in FIG. 1 is inserted into the corrugated tube from the vehicle body-side end of the corrugated tube. FIG. 4 is a schematic sectional view showing a state where the curvature-raining member is held by the vehicle body-side tube-fixing opening in the vehicle body-side swinging member together with the vehicle body-side end of the corrugated tube.

Although details will be described later, the curvature-restraining member 20 includes a cylindrical portion 20a, and the electric wires 11 pass through one end of the curvature-restraining member 20. An edge of the cylindrical portion 20a is provided with a flange 20b. The curvature-restraining member 20 is inserted into the corrugated tube 12 such that the flange 20b is exposed outside.

An outer peripheral surface of the corrugated tube 12 is formed with projections and depressions 12a and 12b. An inner peripheral surface of the vehicle body-side tube fixing opening 423 in the vehicle body-side swinging member 42 is formed with projections and depressions 423a and 423b such that they are fitted to the projections and depressions 12a and 12h of the outer peripheral surface of the corrugated tube 12 and the flange 20b of the curvature restraining member 20 which is exposed from the corrugated tube 12.

As described above, the first swinging member 421 and the second swinging member 422 are assembled together and the vehicle body-side swinging member 42 is configured. At this time, the corrugated tube 12 and the curvature restraining member 20 are sandwiched between the first swinging member 421 and the second swinging member 422 such that the projections and depressions 12a and 12b of the corrugated tube 12 and the flange 20b of the curvature restraining member 20 are fitted to the projections and depressions 423a and 423b of the vehicle body-side tube fixing opening 423. According to this, the curvature-restraining member 20 is held by the vehicle body-side tube fixing opening 423 in the vehicle body-side swinging member 42 together with the vehicle body-side end of the corrugated tube 12.

Figure 5A:
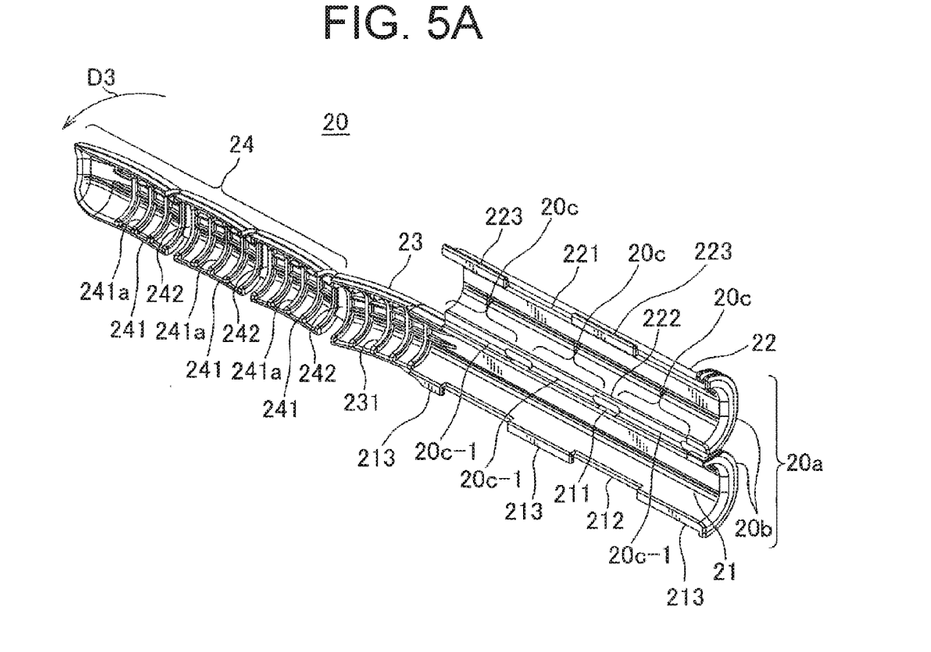
FIGS. 5A and 5B are perspective views showing the curvature restraining member in detail.
Figure 5B:
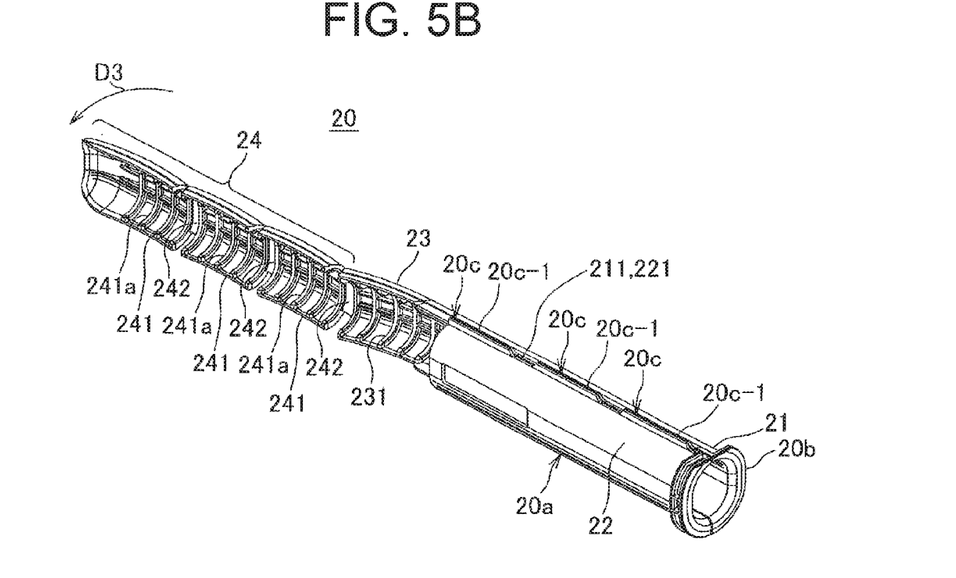

FIGS. 5A and 5B are perspective views showing the curvature-restraining member in detail. As described above, the curvature-restraining member 20 includes the cylindrical portion 20a, and the flange 20b is formed on the edge of the curvature-restraining member 20, and the cylindrical portion 20a includes two parts which are connected to each other through hinges 20c such that the two parts can open and close. FIG. 5A shows a state where the cylindrical portion 20a is opened and FIG. 5B shows a state where the cylindrical portion 20a is closed.

The curvature-restraining member 20 is made of resin, and is placed between an inner surface of the corrugated tube 12 and the electric wires 11 in the wire harness 10 shown in FIG. 1. The curvature-restraining member 20 restrains the wire harness 10 from curving with an excessively small radius of curvature in the curving direction D3 shown in FIG. 1 also. The curvature restraining member 20 includes a body portion 21 and a lid 22 which configure the cylindrical portion 20a, a curved portion 23 which extends from one end of the body portion 21 on the opposite side from the flange 20b, and a flexible portion 24 connected to one end of the curved portion 23 on the opposite side from the body portion 21.

The electric wires 11 pass through the cylindrical portion 20a. The cylindrical portion 20a has a cylindrical shape having a long circular cross section extending straightly in a length direction of the electric wires 11. As shown in FIGS. 3 and 4, the cylindrical portion 20a is placed in the vicinity of the vehicle body-side end of the corrugated tube 12. The body portion 21 is formed into a shape forming a portion of the cylindrical portion 20a in an inner peripheral direction of the corrugated tube 12. More specifically, when the cylindrical portion 20a including a flange 20b are divided into two piece at a cutting plane passing through a long shaft in the long circular cross section and extending in the length direction, the body portion 21 corresponds to one of the two pieces.

The lid 22 is formed into a shape forming the other part of the cylindrical portion 20a. More specifically, the lid 22 corresponds to the other one of the two pieces when the cylindrical portion 20a including the flange 20b are divided into the two pieces. The lid 22 is connected to a first side edge 211 of a pair of side edges 211 and 212 extending in the length direction of the electric wires 11 in the body portion 21 through the hinges 20c such that the lid 22 can open and close.

The hinges 20c are provided with a folded line 20c-1 on a central portion in a widthwise direction of the hinges 20c, and the folded line 20c-1 is straightly thinner than other portions. In this embodiment, three hinges 20c are arranged along the first side edge 211.

Three first ribs 213 are arranged on second side edges 212 of a pair of side edges 211 and 212 of the body portion 21 at distances from one another along the second side edges 212. The first ribs 213 project in a direction intersecting with a peripheral wall of the cylindrical portion 20a.

A pair of side edges 221 and 222 extend in the length direction of the electric wires 11 in the lid 22. Two second ribs 223 projecting in a direction intersecting with the peripheral wall of the cylindrical portion 20a are arranged along the side edge 222 on the opposite side from the hinges 20c. The two second ribs 223 are placed between the first ribs 213 of the body portion 21 when the lid 22 is closed. As shown in the perspective view in FIG. 3, the second ribs 223 and the first ribs 213 are arranged in the line. If the lid 22 is closed and the cylindrical portion 20a is formed, the first ribs 213 and the second ribs 223 which are arranged in the line form one rib 20d (FIG. 3) which projects in a direction intersecting with the peripheral wall of the cylindrical portion 20a.

The one rib 20d functions to prevent the curvature-restraining member 20 from rotating in the inner peripheral direction of the corrugated tube 12 in the corrugated tube 12. If the lid 22 is closed and the cylindrical portion 20a is formed as shown in FIG. 5B, the folded hinges 20c projects in a rib form in the direction intersecting with the peripheral wall of the cylindrical portion 20a, and this folded hinges 20c also functions together with the one rib 20d to prevent the curvature restraining member 20 from rotating.

Figure 6:
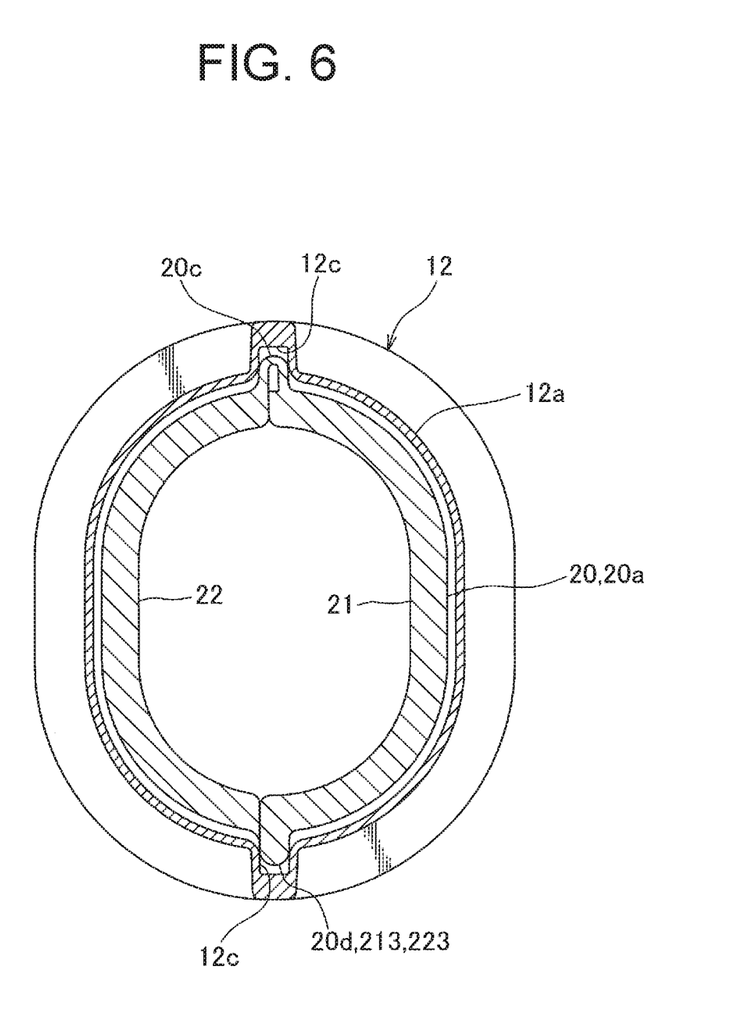
FIG. 6 is a diagram showing a state where the curvature restraining member is prevented from rotating in the inner peripheral direction of the corrugated tube in the corrugated tube.

FIG. 6 is a diagram showing a state where the curvature-restraining member is prevented from rotating in the inner peripheral direction of the corrugated tube in the corrugated tube. FIG. 6 shows a cross section which is cut along a cutting plane which passes through a bottom of the depression 12a in the outer peripheral surface of the corrugated tube 12 and the cylindrical portion 20a in the curvature restraining member 20 in the structure in which the curvature restraining member 20 is inserted into the corrugated tube 12.

As shown in FIG. 6, a pair of grooves 12c is formed in the inner surface of the corrugated tube 12. The grooves 12c are opposed to each other and open at a position through which a long axis of the long circular cross section passes, and the grooves 12*c* extend in the length direction of the corrugated tube 12. The hinge 20*c* which is folded and projects in a rib form is fitted into one of the pair of grooves 12*c*, and the one rib 20*d* including the first ribs 213 and the second ribs 223 which are arranged in the line is fitted into the other one of the pair of grooves 12*c*. FIG. 3 also shows a state where the one rib 20*d* is fitted into the groove 12*c* of the corrugated tube 12. By fitting the one rib 20*d* and the hinges 20*c* into the grooves 12*c*, the curvature-restraining member 20 is prevented from rotating in the inner peripheral direction of the corrugated tube 12.

The curved portion 23 shown in FIGS. 5A and 5B extends from one end of the body portion 21 on the opposite side from the flange 20*b*, i.e., from one end of the corrugated tube 12 on the opposite side from the end thereof such that the curved portion 23 cannot be folded with respect to the body portion 21. This curved portion 23 is continuous with the body portion 21 to surround the electric wires 11 which pass through the cylindrical portion 20*a*, and curves in the widthwise direction and extends, and also curves in the curving direction D3. At this time, a radius of curvature of the curved portion 23 in the curving direction D3 is a radius of curvature not less than a predetermined reference radius. A length of the curved portion 23 in the extending direction is set such that the length falls within the straightly extending corrugated tube 12. A reinforcing rib 231 is formed on the inner surface of the curved portion 23 in lattice form. The curved portion 23 extends such that it cannot be folded with respect to the body portion 21 in the curvature-restraining member 20. The wire harness 10 shown in FIG. 1 is restrained from excessively curving in the curving direction D3 with a radius of curvature smaller than that of the curved portion 23.

The flexible portion 24 has flexible property by connecting the three to-be connected walls 241 to each other such that they can be folded in the curving direction. D3 by a connecting hinge 242. One of the three to-be connected walls 241 which is adjacent to the curved portion 23 is connected to one end of the curved portion 23 on the opposite side from the body portion 21 by the same connecting hinge 242 such that the one of the three to-be connected walls 241 can be folded in the curving direction D3.

The flexible portion 24 can be folded in the curving direction D3 until the end edge of the to-be connected wall 241 which is adjacent to the curved portion 23 abuts against the end edge of the curved portion 23 and the end edges of the to-be connected walls 241 abut against each other. At this time, each of the to-be connected walls 241 is curved with the same radius of curvature as that of the curved portion 23 in the length direction, in the length direction of the to-be connected wall 241 so that the flexible portion 24 is continuous with the curved portion 23 and is formed into a smoothly curved shape when the flexible portion 24 is folded to its limit in the curving direction D3. In this manner, the flexible portion 24 can be curved until it forms the curved shape which is continuous with the curved portion 23, the flexible portion 24 is connected, through the connecting hinge 242, to the one end of the curved portion 23 on the opposite side from the body portion 21 such that the flexible portion 24 cannot curve with a radius of curvature smaller than that of the curved shape, and the flexible portion 24 has such flexible property that the flexible portion 24 can curve until the curved shape is formed but the flexible portion 24 cannot curve with a small radius of curvature. A reinforcing rib 241*a* is provided also on an inner surface of each of the to-be connected wall 241 like the inner surface of the curved portion 23. A portion of the flexible portion 24 separated away from the curved portion 23 curves with respect to the wire harness 10 shown in FIG. 1, and the flexible portion 24 is restrained from excessively curving in the curving direction D3 with a radius of curvature smaller than the above-described radius of curvature.

When the wire harness 10 curves in the curving direction D3 as the sliding door 50 opens or closes as shown in FIG. 1, the electric wires 11 in the wire harness 10 make a bending habit corresponding to the curving in some cases. In the power feeding device 1, when the sliding door 50 is closed, the end of the wire harness 10 on the side of the sliding door 50 is moved in a direction opposite from that when the sliding door 50 opens, and the wire harness 10 is bent back and extended inward of the vehicle. The curvature-restraining member 20 shown in FIGS. 5A and 5B restrains excessive curvature of the wire harness 10, and the curvature restraining member 20 functions to correct the bending habit of the electric wires 11 when the wire harness 10 as will be described below.

Figure 7A:
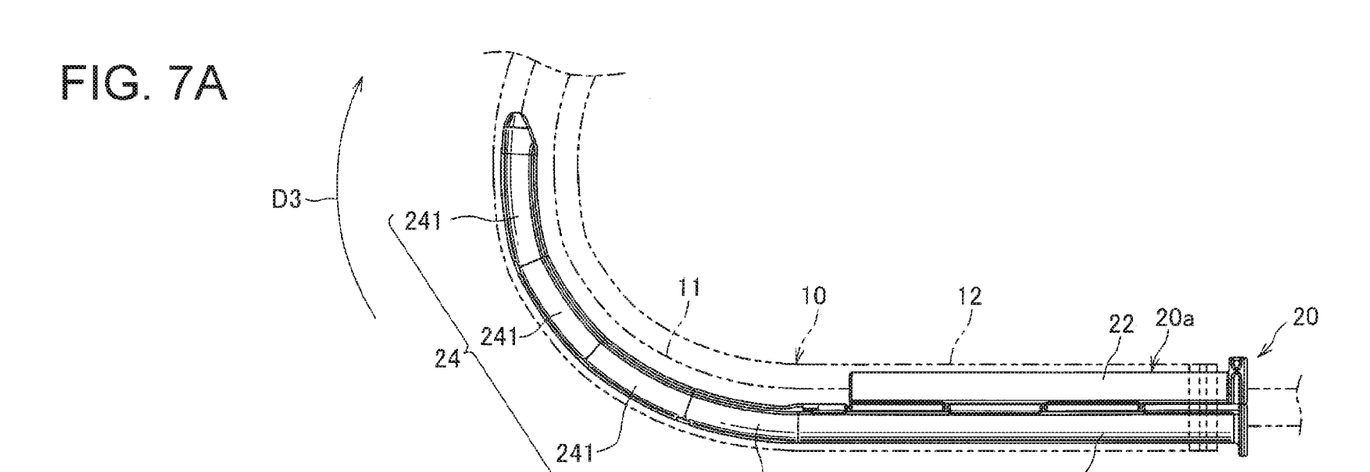
FIGS. 7A and 7B are diagrams showing a state where a bending habit of electric wires in the wire harness when the wire harness is curved is corrected by the curvature restraining member when the wire harness is bent back and extended.
Figure 7B:
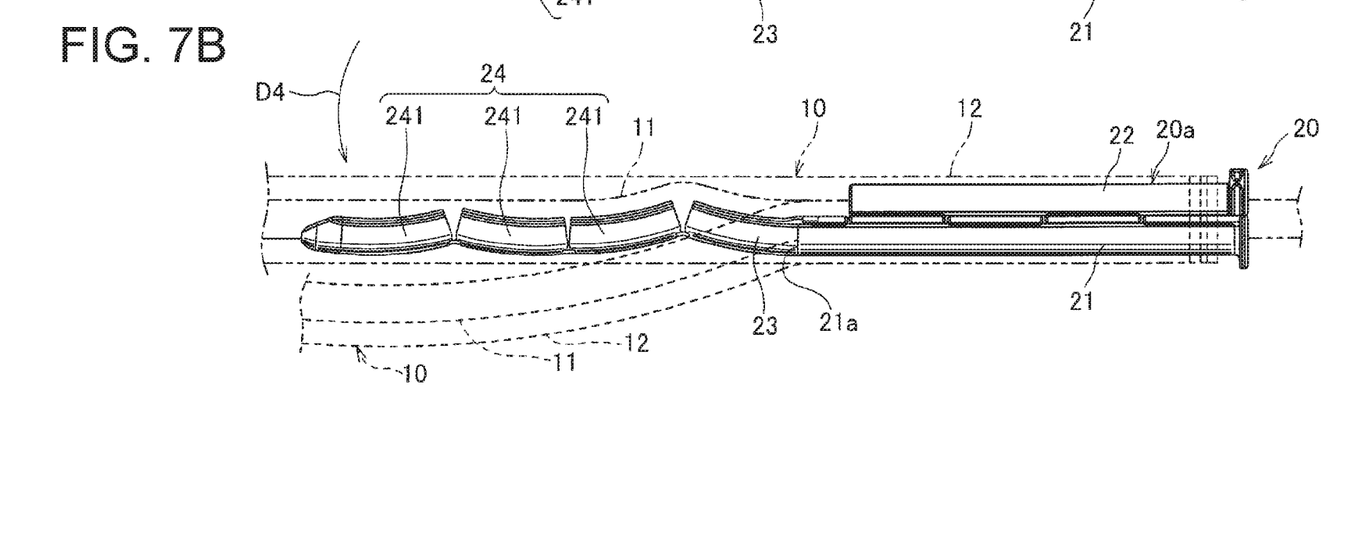

FIGS. 7A and 7B are diagrams showing a state where a bending habit of electric wires in the wire harness when the wire harness is curved is corrected by the curvature restraining member when the wire harness is bent back and extended. FIG. 7A shows the curvature restraining member 20 when the wire harness 10 curves, and FIG. 7B shows the curvature restraining member 20 when the wire harness is bent back and extended. In FIGS. 7A and 7B, the wire harness 10 having the electric wires 11 and the corrugated tube 12 is shown by two-dot chain lines, and the curvature restraining member 20 is shown by solid lines.

In the curvature-restraining member 20, the curved portion 23 which cannot be folded with respect to the body portion 21 and has the shape curving in the curving direction D3 functions to correct the bending habit of the electric wires 11.

Here, assume that the curved portion 23 is connected to the body portion 21 through the hinge such that the curved portion 23 can be folded with respect to the body portion 21 like the to-be connected wall 241 of the flexible portion 24 unlike the embodiment. In this case, if the wire harness 10 provided with the electric wires 11 therein having the bending habit is bent back in a direction D4 opposite from the curving direction D3, as shown by dotted lines in FIG. 7B, the wire harness 10 is folded back in the opposite direction D4 around the end 21*a* of the body portion 21 while leaving the curved shape corresponding to the bending habit of the electric wires 11 in some cases.

The wire harness 10 is bent back when the sliding door 50 is closed toward the fully closed state shown in FIG. 1, but if the wire harness 10 is bent back in a state where it is folded as described above, the wire harness 10 has convex-curved shape inside the vehicle when the sliding door 50 fully closes. Such a convex-curved wire harness 10 inward of the vehicle is prone to attract passenger's attention, and there is fear that outward appearance in the vehicle is deteriorated.

In contrast, in this embodiment, when the wire harness 10 is bent back, the electric wires 11 are guided in the curving direction D3 by the curved portion 23 which can be folded with respect to the body portion 21 and which curves in the curving direction D3, and the electric wires 11 are bent back. Even if the electric wires 11 have the bending habit when the wire harness 10 is curved, the curved shape of the bending habit of the electric wires 11 is reformed as shown by the two-dot chain lines in FIG. 7B by the guidance of the curved portion 23 in the curving direction D3 and bending back in the opposite direction D4. That is, when the wire harness 10 is extended, the bending habit of the electric wires 11 is corrected. According to the curvature-restraining member 20 of this embodiment, it is possible to suppress the excessive curvature of the wire harness 10, and to suppress the bending habit of the electric wires 11 when the wire harness 10 is extended after it is curved.

According to the curvature-restraining member 20 of the embodiment, the body portion 21 and the lid 22 form the cylindrical portion 20a. Therefore, strength against external force applied to the body portion 21 when the wire harness 10 is bent is enhanced.

According to the curvature restraining member 20 of the embodiment, the strength against external force applied to the body portion 21 is further enhanced by the first ribs 213 and the second ribs 223 which are arranged in the one line.

According to the curvature-restraining member 20 of the embodiment, the one rib 20d including the first ribs 213 and the second ribs 223 is fitted into the grooves 12c formed in the inner surface of the corrugated tube 12. Therefore, the curvature-restraining member 20 is prevented from rotating in the inner peripheral direction of the corrugated tube 12.

According to the curvature restraining member 20 of the embodiment, the flexible portion 24 is connected to the curved portion 23 through the connecting hinge 242 such that the flexible portion 24 can curve up to the curved shape which is continuous with the curved portion 23 but cannot curve in a curved shape which is smaller than that of the curved portion 23, and the flexible portion 24 has such flexible property that the curved portion 23 itself can curve. According to this, a portion of the flexible portion 24 separated away from the curved portion 23 can curve, but the flexible portion 24 is restrained from curving with an excessive small radius of curvature in the wire harness 10. According to the curvature-restraining member 20 of the embodiment, it is possible to further suppress the excessive curvature of the wire harness 10.

The above-described embodiment only shows a typical example of the present invention, and the present invention is not limited to this embodiment. That is, it is possible to variously modify the present invention within a range not departing from the subject matter of the present invention. Such modifications are also included in a category of the present invention as long as the modifications include the configurations of the curvature-restraining member and the power-feeding device of the present invention.

For example, the curvature-restraining member 20 including the lid 22 and the flexible portion 24 is shown as one example of the curvature-restraining member of the present invention. However, the curvature-restraining member of the present invention is not limited to this. Other configurations of the curvature restraining member of the present invention are not limited only if the curvature restraining member includes the body portion extending straightly and the curved portion which extends and curves such that it cannot be folded with respect to the body portion. However, the strength is enhanced by providing the lid, and curvature of the wire harness with an excessively small radius of curvature can further be restrained by providing the flexible portion as described above.

In the above-described embodiment, the body portion 21 formed into a shape forming a portion of the cylindrical portion 20a having the long circular cross section is shown as one example of the body portion of the present invention, and the lid 22 formed into a shape forming other portion of the cylindrical portion 20a is shown as one example of the lid of the present invention. However, the body portion and the lid of the present invention are not limited to these. The body portion and the lid of the present invention may have shapes forming a portion of a cylinder having a cross section shape other than the long circular shape such as a rectangular cross section and a circular cross section.

In the above-described embodiment, the flexible portion 24 in which the three to-be connected walls 241 are connected to each other through the connecting hinge 242 is shown as one example of the flexible portion of the present invention. However, the flexible portion of the present invention is not limited to this. The number of the to-be connected walls is not limited to three, and the flexible portion may be a scoop-shaped portion which is soft so that the flexible portion can curve with a radius of curvature smaller than a predetermined reference radius, and specific configuration is not limited.

In the embodiment, the power feeding device 1 provided with the curvature restraining member 20 on the side of the vehicle body in the corrugated tube 12 is shown as one example of the power feeding device of the present invention. However, the power-feeding device of the present invention is not limited to this. The power-feeding device of the present invention may be provided with the curvature-restraining member on the side of the sliding door in the flexible tube, or the curvature-restraining members may respectively be provided on the side of the vehicle body and on the side of the sliding door in the flexible tube.

What is claimed is:

1. A curvature restraining member in which a wire harness includes an electric wire and a flexible tube through which the electric wire is inserted, the curvature restraining member being placed between an inner surface of the flexible tube and the electric wire in the wire harness, and the curvature restraining member restraining the wire harness from curving with a radius of curvature smaller than a reference radius in a predetermined curving direction, the curvature restraining member comprising:
    a body portion placed near at least one end of the flexible tube and extending straightly; and
    a curved portion extending from one end of the body portion opposite from the one end of the flexible tube, formed unfoldably with respect to the body portion, and curving in the curving direction with a radius of curvature not less than the reference radius and with a length that fits in the flexible tube when the flexible tube straightly extends.

2. The curvature restraining member according to claim 1, wherein
    the body portion is formed into a shape forming a portion of a cylinder through which the electric wire passes, and
    the curvature restraining member includes a lid openably connected through a hinge to one side edge of a pair of side edges extending in the length direction of the electric wire in the body portion, and having a shape forming the other portion of the cylinder.

3. The curvature restraining member according to claim 2, wherein
    a plurality of first ribs projecting in a direction intersecting with a peripheral wall of the cylinder is arranged along the other side edge of the pair of side edges of the body portion at a distance from each other, and
    a plurality of second ribs projecting in the direction intersecting with the peripheral wall is placed on a side edge opposite from the hinge, of the pair of side edges projecting in the length direction of the electric wire in the lid, and is arranged between the first ribs when the lid is closed, so as to stand in a line with the first ribs.

4. The curvature restraining member according to claim 3, wherein a groove extending in a length direction of the flexible tube is formed in an inner surface of the flexible tube, and the first ribs and the second ribs which are arranged in the line when the lid is closed are fitted into the groove.

5. The curvature restraining member according to claim 1, further comprising a flexible portion formed such that a flexible property thereof is capable of being curved until a curved shape which is continuous with the curved portion is formed, and is incapable of being curved with a radius of curvature smaller than the curved shape, wherein the flexible portion is connected to one end of the curved portion opposite from the body portion through a hinge so as to be curved until the curved shape is formed, and to be curved with the radius of curvature smaller than the curved shape.

6. The curvature restraining member according to claim 2, further comprising a flexible portion formed such that a flexible property thereof is capable of being curved until a curved shape which is continuous with the curved portion is formed, and is incapable of being curved with a radius of curvature smaller than the curved shape, wherein the flexible portion is connected to one end of the curved portion opposite from the body portion through a hinge so as to be curved until the curved shape is formed, and to be curved with the radius of curvature smaller than the curved shape.

7. The curvature restraining member according to claim 3, further comprising a flexible portion formed such that a flexible property thereof is capable of being curved until a curved shape which is continuous with the curved portion is formed, and is incapable of being curved with a radius of curvature smaller than the curved shape, wherein the flexible portion is connected to one end of the curved portion opposite from the body portion through a hinge so as to be curved until the curved shape is formed, and to be curved with the radius of curvature smaller than the curved shape.

8. The curvature restraining member according to claim 4, further comprising a flexible portion formed such that a flexible property thereof is capable of being curved until a curved shape which is continuous with the curved portion is formed, and is incapable of being curved with a radius of curvature smaller than the curved shape, wherein the flexible portion is connected to one end of the curved portion opposite from the body portion through a hinge so as to be curved until the curved shape is formed, and to be curved with the radius of curvature smaller than the curved shape.

9. A power-feeding device which electrically connects a vehicle body and a sliding door through a wire harness in a vehicle having the sliding door, wherein the wire harness includes an electric wire and a flexible tube through which the electric wire is inserted, the power feeding device comprising:

a supporting member fixed to the vehicle body or the sliding door;

a swinging member holding one end of the flexible tube and pivotally supported by the supporting member such that the swinging member can swing around a swinging axis parallel to the sliding door and vertical to an opening/closing direction of the sliding door; and a curvature restraining member placed between an inner surface of the flexible tube and the electric wire for restraining the wire harness from curving in a predetermined curving direction with a radius of curvature smaller than a reference radius, wherein the curvature restraining member includes a body portion placed near at least one of ends of the flexible tube and extending straightly, and a curved portion extending from one end of the body portion opposite from the one end of the flexible tube, formed unfoldably with respect to the body portion, and curving in the curving direction with a radius of curvature not less than the reference radius and with a length that fits in the flexible tube when the flexible tube straightly extends.

\* \* \* \* \*